July 14, 1936.         H. LUND              2,047,831
                    INDUCTION MOTOR
                   Filed Nov. 5, 1935
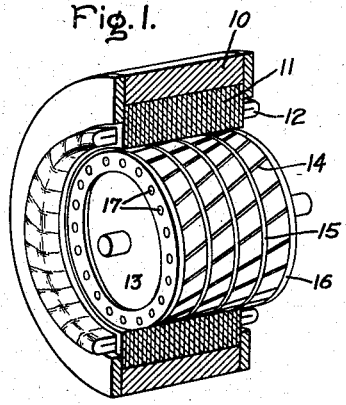
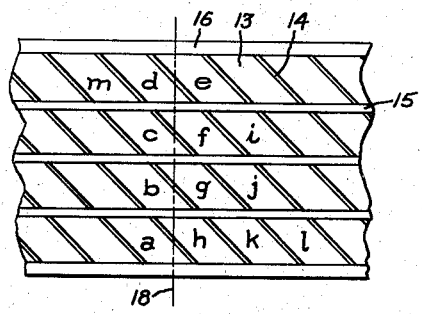
Inventor:
Hans Lund,
by Harry E. Dunham
His Attorney Patented July 14, 1936

2,047,831

UNITED STATES PATENT OFFICE 2,047,831

INDUCTION MOTOR

Hans Lund, Berlin-Schoneberg, Germany, assignor to General Electric Company, a corporation of New York Application November 5, 1935, Serial No. 48,418
In Germany November 8, 1934

3 Claims. (Cl. 172—120)

My invention relates to induction motors of the squirrel cage variety and its object is to provide such a motor which is very quiet in operation.

Investigations with regard to magnetic noises in induction motors reveal that part of such noises are traceable to the vibration of the machine as a whole. Another part of such noises is due to the vibration of individual parts of the machine, such as the stator teeth which in turn cause vibration of the laminations. It is the object of the present invention to reduce all such noises to a minimum consistent with economy of design.

I accomplish this result not only by spiraling the slots of the rotor with respect to those in the stator, but also by providing a plurality of individual short-circuited paths beneath each stator tooth or conductor whereby the flux pulsations and induced secondary voltages and currents are apparently broken up into a relatively greater number of relatively smaller components than is usual. The forces producing magnetic vibration are thus made much smaller and also apparently a great number of the magnetic vibratory forces become more or less opposed to each other and in effect cancel out. A complete and accurate explanation of the theory involved has not been derived and the explanation given above, while it is believed to be reasonable, may not be correct.

The features of my invention which are believed to be novel and patentable will be pointed out in the claims appended hereto. For a better understanding of my invention, reference is made in the following description to the accompanying drawing showing in Fig. 1 an induction motor partially in section having a rotor embodying the present invention, and Fig. 2 is a portion of the rotor surface as it would appear laid out in a flat plane.

The stator here represented as the primary is of usual construction having a framework 10 supporting magnetic laminations 11 internally slotted to provide axial rows of teeth. A suitable alternating current winding 12 is contained in the stator slots. A stator of the shaded pole variety might be used.

The rotor here represented as the secondary comprises a cylindrical laminated magnetic core 13 having spiral slots 14 and one or more recesses about the core intermediate the ends thereof in which are contained one or more intermediate rings 15, forming part of the squirrel cage winding structure. The usual end rings 16 are also provided and bars indicated at 17 are contained in the spiral slots and joined to the intermediate and end rings 15 and 16. Preferably the secondary winding structure is a cast construction as it may be cast more economically than it can be constructed otherwise. The intermediate rings 15 do not need to be so heavy as the end rings 16, as in general the intermediate ring will carry less resultant cross current. It is now apparent that instead of a single squirrel cage winding I have provided a great number and variety of squirrel cages, all responsive to the usual stator fluxes.

In Fig. 2, I have indicated by the dotted line 18 the direction of the stator teeth and slots. It is evident that a flux pulsation emanating from a stator tooth along line 18 will pass into the rotor so as to cut a great number and variety of different secondary closed circuits. Thus there are eight small independent closed circuits surrounding the diamond-shaped areas designated $a$ to $h$, inclusive, which are cut by flux along the line 18. The closed secondary circuits, such as that surrounding the area $d\ e$, the circuit surrounding the area $d\ e\ f\ i$ and the closed circuit enclosing area $m\ d\ c\ f\ g\ j\ h\ k$ are only a few examples of the large number and variety of closed circuits cut by flux entering the rotor along line 18. These closed circuits extend to a greater or less extent into the region beneath other stator teeth. As a consequence of this construction, the magnetic forces tending to produce vibration are broken up into a wide variety of small forces, many of which are believed to be opposed and cancel out, reducing magnetic vibration noises without, however, in any way reducing the motor torque forces. The grid-like secondary winding structure approaches in effect a continuous shell in the respect of providing an infinite number and variety of closed paths for the secondary currents. However, the magnetic air gap of the machine is not reduced as would be the case if a continuous cylindrical shell were used. The rotor laminated punchings may be made all alike and the recesses for the intermediate rings turned therein after assembly or two sets of properly-shaped punchings may be used and assembled to provide the necessary recesses. In any event the construction is not much more expensive than the ordinary spiral squirrel cage rotor where the secondary winding is formed by a casting operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. An induction motor comprising primary and secondary members, both having slotted laminated magnetic cylindrical surfaces defining the air gap between them, the slots in the secondary member being spiraled with respect to the slots in the primary, a secondary winding in the slots of the secondary member composed of conductors in said slots joined at their ends and at least at one intermediate point by conductor rings.

2. A secondary rotor structure for induction motors comprising a cylindrical laminated magnetic core containing spiral slots, and one or more recesses about the core intermediate its ends, a cast secondary winding therefor consisting of conducting material filling said slots and recesses and having end rings.

3. A secondary member for induction motors comprising a magnetic core member having a cylindrical surface containing spiraled slots, a squirrel cage winding having conductors in said slots and conductor rings connecting said conductors at a plurality of points intermediate their ends.

HANS LUND.